United States Patent
Andonieh et al.

(10) Patent No.: US 11,121,818 B2
(45) Date of Patent: Sep. 14, 2021

(54) METHOD AND APPARATUS FOR UNSOLICITED BLOCK ACKNOWLEDGEMENTS

(71) Applicant: PERASO TECHNOLOGIES INC., Toronto (CA)

(72) Inventors: Joseph Andonieh, Aurora (CA); Gary Cheng, Unionville (CA); Christopher James Hansen, Los Altos, CA (US); Bradley Robert Lynch, Toronto (CA)

(73) Assignee: PERASO TECHNOLOGIES INC., Toronto (CA)

(*) Notice: Subject to any disclaimer, the term of this patent is extended or adjusted under 35 U.S.C. 154(b) by 381 days.

(21) Appl. No.: 15/651,835

(22) Filed: Jul. 17, 2017

(65) Prior Publication Data
US 2018/0026752 A1 Jan. 25, 2018

Related U.S. Application Data

(60) Provisional application No. 62/365,558, filed on Jul. 22, 2016.

(51) Int. Cl.
*H04L 1/16* (2006.01)
*H04W 8/14* (2009.01)
(Continued)

(52) U.S. Cl.
CPC .......... *H04L 1/1614* (2013.01); *H04L 1/1621* (2013.01); *H04L 1/1628* (2013.01); *H04W 8/24* (2013.01); *H04W 84/12* (2013.01)

(58) Field of Classification Search
CPC ... H04L 1/1614; H04L 1/1621; H04L 1/1628; H04W 84/12; H04W 8/24
See application file for complete search history.

(56) References Cited

U.S. PATENT DOCUMENTS

2006/0107166 A1* 5/2006 Nanda .................. H04B 7/0417
714/748
2007/0186134 A1 8/2007 Singh et al.
(Continued)

OTHER PUBLICATIONS

"802.11-2012; 802.11-2012" [Abstract], IEEE Draft; 802.11-2012, IEEE-SA, Piscataway, NJ USA, vol. 802.11, April 18, 2012 (Apr. 18, 2012), pp. 1-2792. Section 6.3.29; Sections 8.3.1.8, 8.3.1.9; Sections 8.4.1.14-8.4.1.16. Available Online: https://legal.vvv.enseirb-matmeca.fr/download/amichel/%5BStandard%20LDPC%5D%20802.11-2012.pdf.

(Continued)

*Primary Examiner* — Jae Y Lee
*Assistant Examiner* — M Mostazir Rahman
(74) *Attorney, Agent, or Firm* — Perry + Currier, Inc.

(57) ABSTRACT

A method and apparatus for establishing unsolicited block acknowledgements is provided. During a process, at a first wireless device, to associate with a basic service set that includes a second wireless communication device, the first wireless device transmits, via a controller and using a radio: an indication that the first wireless communication device supports block acknowledgements; and at least one common block acknowledgement parameter defining unsolicited block acknowledgement. Thereafter, the first wireless communication device exchanges data with the second wireless communication device according to the at least one common block acknowledgement parameter defining the unsolicited block acknowledgement.

16 Claims, 10 Drawing Sheets

(51) Int. Cl.
*H04W 8/24* (2009.01)
*H04W 84/12* (2009.01)

(56) References Cited

U.S. PATENT DOCUMENTS

| | | | | |
|---|---|---|---|---|
| 2008/0151881 A1* | 6/2008 | Liu | ................... | H04L 1/0002 |
| | | | | 370/389 |
| 2012/0113879 A1* | 5/2012 | Aoki | ................... | H04L 1/1614 |
| | | | | 370/311 |
| 2016/0248569 A1* | 8/2016 | Ghosh | ................... | H04L 1/1614 |
| 2016/0330714 A1* | 11/2016 | Hedayat | ............ | H04W 72/1289 |
| 2017/0055300 A1* | 2/2017 | Pitchaiah | .............. | H04L 1/1621 |

OTHER PUBLICATIONS

Stacey, R. (Apple): "FILS association; 11-12-0296-00-00ai-fils-association", IEEE SA Mentor; 11-12-0296-00-00AI-FILS-Association, IEEE-SA Mentor, Piscataway, NJ, USA, vol. 802.11ai, Mar. 9, 2012. doc.: IEEE 802.11-11/0296r0. [Retrieved on Mar. 11, 2012].

Extended European Search Report (EESR) dated Nov. 17, 2017, by EPO, re European Patent Application No. 17182178.8.

\* cited by examiner

METHOD AND APPARATUS FOR UNSOLICITED BLOCK ACKNOWLEDGEMENTS

CROSS-REFERENCE TO RELATED APPLICATIONS

This application claims priority from U.S. provisional patent application No. 62/365,558 filed Jul. 22, 2016. The contents of the above application are incorporated herein by reference.

FIELD

The specification relates generally to wireless communications, and specifically to a method and apparatus for a method and apparatus for unsolicited block acknowledgements.

BACKGROUND

Block acknowledgements are used to acknowledge packets and/or data, which are exchanged between devices, in blocks. Block acknowledgement agreements exist, for example, in the 802.11 specification. However, there is bandwidth and processing cost to setting up such block acknowledgement agreements. For example, such block acknowledgement agreements are generally negotiated each time two devices associate, using, for example, ADDBA (add block acknowledgement) requests and responses, which generally adds to the overhead in setting up an association and/or a block acknowledgment agreement. Once the two devices are no longer associated, and when the two devices reassociate at a later time, a block acknowledgement agreement must again be negotiated, again wasting processing time and resources. Indeed, if an inactivity timer for the agreement is used, the two devices may have to re-establish the agreement each time the inactivity timer reaches a threshold time and the agreement is deleted, even if a connection is maintained between them, and hence a block acknowledgement agreement must again be negotiated each time. Similarly, the agreement can also be deleted by any of the two devices due to a conflict of resources and thus require the establishment of another agreement again to use aggregation.

SUMMARY

An aspect of the specification provides A method of a first wireless communication device for establishing unsolicited block acknowledgements with a second wireless communication device, comprising: during a process to associate with a basic service set that includes the second wireless communication device, transmitting, via a controller and using a radio: an indication that the first wireless communication device supports block acknowledgements; and at least one common block acknowledgement parameter defining unsolicited block acknowledgement; and thereafter, exchanging data with the second wireless communication device according to the at least one common block acknowledgement parameter defining the unsolicited block acknowledgement.

Another aspect of the specification provides a wireless communication device for establishing unsolicited block acknowledgements with a second wireless communication device, the wireless communication device comprising: a controller interconnected with a memory and a radio, the controller configured to: during a process to associate with a basic service set that includes the second wireless communication device, transmit, using the radio: an indication that the first wireless communication device supports block acknowledgements; and at least one common block acknowledgement parameter defining unsolicited block acknowledgement; and thereafter, exchange data with the second wireless communication device according to the at least one common block acknowledgement parameter defining the unsolicited block acknowledgement.

Another aspect of the specification provides a method in a wireless communications assembly of a receiver station for establishing unsolicited block acknowledgements with sender stations, comprising: storing, in a memory, at least one common block acknowledgement parameter defining the unsolicited block acknowledgements; sending a control data frame for receipt by one of the sender stations, the control data frame including (i) an indication that the receiver station supports block acknowledgements; and (ii) the at least one common block acknowledgement parameter; responsive to sending the control data frame, receiving a plurality of payload data frames from the one sender station; and responsive to receiving the payload data frames, sending a block acknowledgement frame for the plurality of payload data frames according to the common block acknowledgement parameter.

Another aspect of the specification provides a method in a wireless communications assembly of a sender station, comprising: receiving a control data frame from a receiver station, the control data frame including (i) an indication that the receiver station supports block acknowledgements; and (ii) at least one common block acknowledgement parameter defining an unsolicited block acknowledgement; responsive to receiving the control data frame, storing the at least one common block acknowledgement parameter in association with an identifier of the receiver station; sending a plurality of payload data frames to the receiver station; and receiving a block acknowledgement frame from the receiver station according to the common block acknowledgement parameter.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some implementations, the terms are understood to be "within 10%," in other implementations, "within 5%", in yet further implementations, "within 1%", and in yet further implementations "within 0.5%".

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
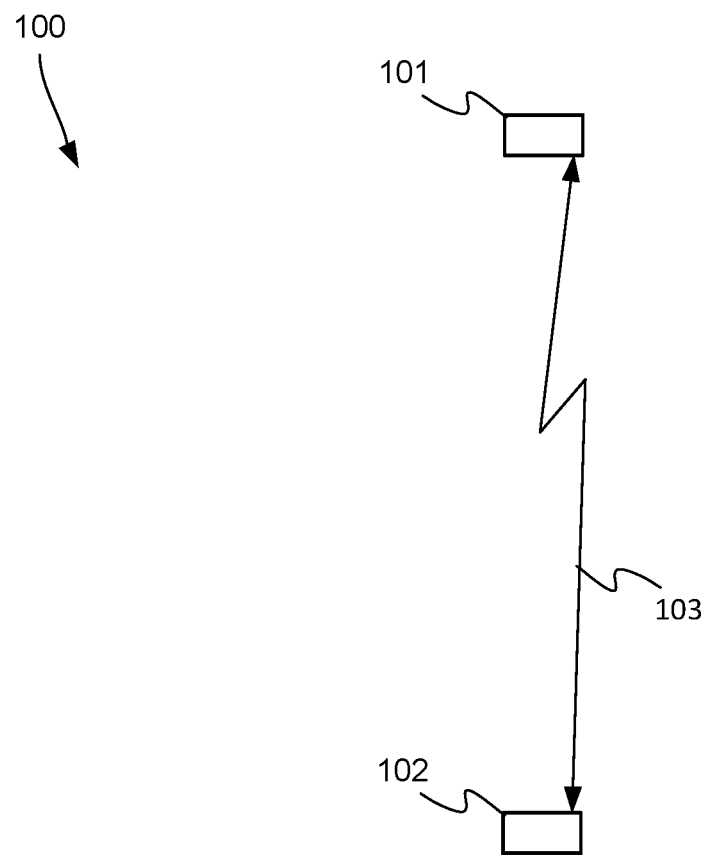
FIG. 1 depicts a wireless communications system, according to non-limiting implementations.

FIG. 1 depicts a wireless communications system 100, including a wireless service set that includes wireless communication devices 101 and 102 that are in communication with each other using a wireless link 103 therebetween which can include, but is not limited to, radio beams, a wireless network, a local wireless network, a WiFi link, cell phone link, and the like. The nature and population of the service set is not particularly limited. As will be apparent to those skilled in the art, the service set of the system 100 may be a personal basic service set (PBSS) consisting of at least a pair of wireless communication devices (e.g. devices 101, 102) in communication with each other. In other examples, the service set may be a basic service set (BSS) such as an infrastructure BSS including an access point (e.g. at least one of the devices 101, 102 is an access point) or an independent BSS. The devices shown in FIG. 1 may each be implementing the IEEE 802.11ad (WiGig) standard or enhancements thereof (e.g. 802.11ay, alternatively referred to as EDMG (Enhanced Directional Multi-Gigabit), and therefore all transmit and receive data at frequencies around 60 GHz. However, the devices 101, 102 may also each be implementing another standard including, but not limited to, another 802.11 standard, a WiFi standard, a cell phone standard, and the like.

Each of the devices 101, 102 are generally configured to set up explicit block acknowledgment agreements and perform block acknowledgments. However, setting up explicit block acknowledgment agreements each time and/or instance the devices 101, 102 associate is inefficient. Indeed, in the present specification the term "explicit block acknowledgment agreements" is understood to mean block acknowledgment agreements which can be negotiated using ADDBA (Request/Response) (add block acknowledgment Request/Response) and DELBA (delete block acknowledgment) management frames to establish or delete the agreement, for example each time devices associate and/or multiple times during an association. Hence, such block acknowledgement agreements are understood to be solicited between the devices 101, 102. The devices 101, 102 are therefore configured for unsolicited block acknowledgements, as described hereafter. While unsolicited block acknowledgements do not define a negotiated agreement between the devices 101, 102, unsolicited block acknowledgements may alternatively be referred as an implicit block acknowledgement as the devices 101, 102 being configured to operate using unsolicited block acknowledgements may define an agreement that is implicit between the devices 101, 102, merely by virtue of the device 101 (and/or the device 102) transmitting an indication that the first wireless communication device supports block acknowledgements; and at least one common block acknowledgement parameter defining unsolicited block acknowledgement.

Furthermore, the term unsolicited block acknowledgements as used herein does not mean that individual block acknowledgements are not requested, but rather the parameters that define the manner in which block acknowledgements occur between devices are not solicited.

Each of the devices 101, 102 can comprise one or more of a mobile device or a non-mobile device, which includes, but is not limited to, any suitable combination of electronic devices, communication devices, computing devices, portable electronic devices, wireless adapters, wireless USB (Universal Serial Bus) adapters, mobile computing devices, portable computing devices, tablet computing devices, laptop computers, PDAs (personal digital assistants), cellphones, smartphones, e-readers, mobile camera devices, personal computers, work stations, access points, servers, media servers, telephones, and the like. Indeed, any device that communicates wirelessly and which can perform block acknowledgments is within the scope of present embodiments.

Figure 2:
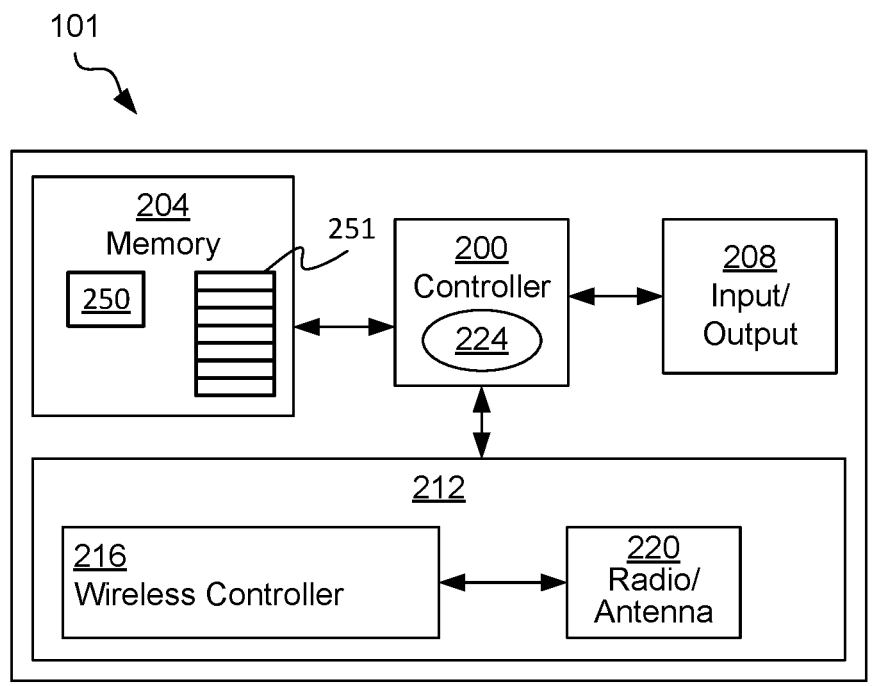
FIG. 2 depicts a block diagram of a receiver device of the system of FIG. 1, according to non-limiting implementations.

Turning now to FIG. 2, before describing the operation of the devices of the system 100 to implement the unsolicited block acknowledgement functionality mentioned above, certain components of the device 101 will be described. The description of the device 101 below also applies to the device 102. That is, the devices 101, 102 each include the components discussed below, though it will be understood that the particular implementation of each component may vary from device to device.

The device 101 includes controller 200 which can include, but is not limited to central processing unit (CPU). The controller 200 is interconnected with a non-transitory computer readable storage medium, such as a memory 204, having stored thereon various computer readable instructions for performing various actions including performing unsolicited block acknowledgement functionality. The memory 204 includes a suitable combination of volatile (e.g. Random Access Memory or RAM) and non-volatile memory (e.g. read only memory or ROM, Electrically Erasable Programmable Read Only Memory or EEPROM, flash memory). The controller 200 and the memory 204 each comprise one or more integrated circuits.

The device 101 may optionally include one or more input devices, and one or more output devices, generally indicated as an optional input/output device 208. The input and output devices 208 serve to receive commands for controlling the operation of the device 101 and for presenting information, e.g. to a user of the device 101. The input and output devices 208 therefore include any suitable combination of devices, including a keyboard, a mouse, a display, a touchscreen, a speaker, a microphone, and the like). However, for example, in devices such as a wireless USB adapter, an access point, and the like, the input/output device 208 may not be present.

The device 101 further includes a wireless communications assembly 212 interconnected with the controller 200. The assembly 212 enables the device 101 to communicate with other communication devices, for example the device 102. In the present example, the assembly 212 enables such communication according to the IEEE 802.11ad standard (and/or the IEEE 802.11ay standard), and thus transmits and receives data at frequencies of around 60 GHz. However, the wireless communications assembly 212 can alternatively be configured to communicate according to other 802.11 standards, cell phone standards, and the like.

The communications assembly 212 includes a wireless controller 216 in the form of one or more integrated circuits and/or logic circuits, configured to establish and maintain wireless communications links with other devices.

The wireless controller 216 is also configured to process outgoing data for transmission via a radio and an antenna, indicated as an radio/antenna 220. The antenna may include, but is not limited to, a phased array of antenna elements and/or antenna sectors, and to receive incoming transmissions from the antenna process the transmissions for communication to the controller 200. The wireless controller 216, in the present example, may include a baseband processor and a transceiver (also referred to as a radio processor), which may be implemented as distinct hardware elements or integrated on a single circuit, including, but not limited to, integrated circuits and/or logic circuits. However, the antenna may alternatively comprise one or more of a dipole antenna, a monopole antenna, a patch antenna, and the like.

Returning to the controller 200, example integrated circuits and/or logic circuits of the controller 200 include one or more processors, one or more microprocessors, one or more ASIC (application-specific integrated circuits) and one or more FPGA (field-programmable gate arrays). In some embodiments, the controller 200 is not a generic processor, but a controller specifically configured to implement implicit block acknowledgement functionality. For example, in some embodiments, the controller 200 specifically comprises a computer executable engine configured to implement specific implicit block acknowledgement functionality.

Further, the controller 200 is configured to execute various computer-readable instructions (e.g. stored in a memory element integrated with the controller 200 or implemented as a discrete hardware component of the controller 200 and/or connected with the controller 200) for performing the above functions. Further, the controller 200 is configured to execute an implicit block acknowledgement application 224, also referred to herein as the application 224. Via the execution of the application 224, the controller 200 is configured to: during a process to associate with a basic service set that includes the second wireless communication device, transmit, using a radio: an indication that the first wireless communication device supports block acknowledgements; and at least one common block acknowledgement parameter defining unsolicited block acknowledgement; and thereafter exchange data with the second wireless communication device 102 according to the at least one common block acknowledgement parameter defining the unsolicited block acknowledgement.

As further depicted in FIG. 2, the memory 204 stores parameters 250 which can be used to define an unsolicited block acknowledgements. The parameters 250 may alternatively referred to as at least one common block acknowledgement parameter 250, as the at least one common block acknowledgement parameter 250 may be common to all block acknowledgement agreements that the device 101 may set up with other devices, such as the device 102. Hereafter, the parameters 250 is interchangeably referred to as parameters 250 (whether the parameters 250 include one value and/or parameter or more than value and/or parameter).

As depicted, a portion of the memory 204 comprises a buffer 251 which may be used with block acknowledgements as described below. While the buffer 251 is depicted as being a portion of the memory 204, the buffer 251 may alternatively be a portion of cache associated with the controller 200 which may also be a portion of the memory 204 and/or a memory element integrated with the controller 200 or implemented as a discrete hardware component of the controller 200 and/or connected with the controller 200. The buffer 251 may comprise a reorder buffer.

Figure 5:
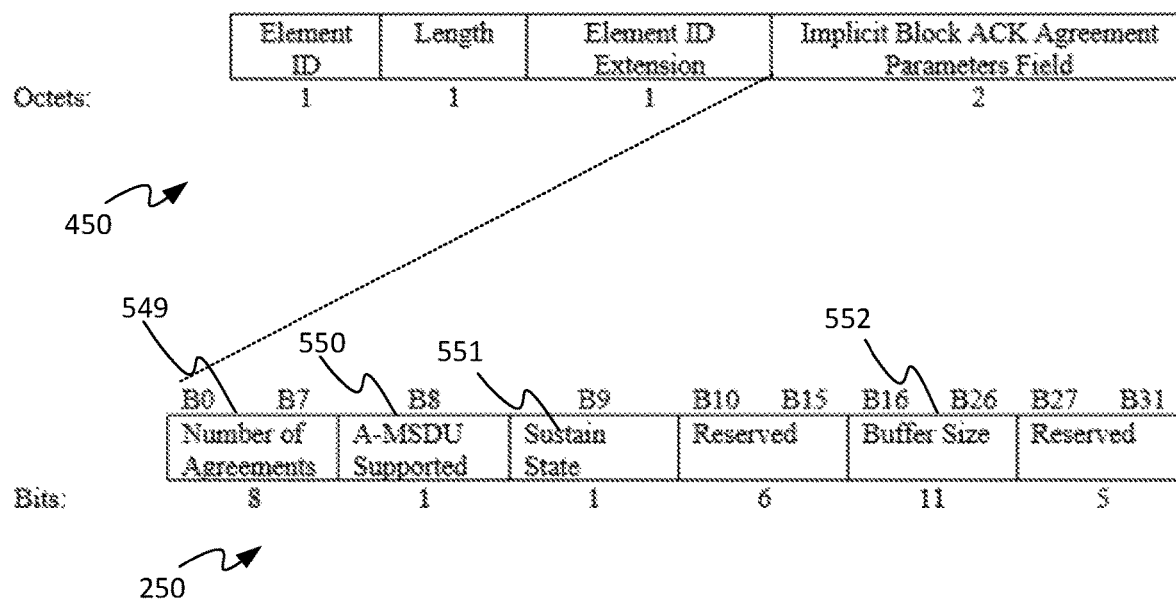
FIG. 5 depicts example formats of an unsolicited block acknowledgement element and implicit block acknowledgment parameters, according to non-limiting implementations.

While the parameters 250 is described in more detail with respect to FIG. 5, the parameters 250 may include, but is not limited to, one or more of: value indicative of a number of a plurality of payload data frames to be received from the second wireless communication device 102 before transmitting a block acknowledgement frame; a value indicative of number of buffers (e.g. in the buffer 251) available to store a plurality of payload data frames to be received from the second wireless communication device 102 before transmitting a block acknowledgement frame; a value indicative of a size of a memory portion of the buffer 251; and the like. Hence, regardless of the format of the parameters 250, the parameters 250 includes a value that is related to a size of a memory portion of the buffer 251.

In general, the parameters 250 are provisioned at the device 101 in a provisioning process and/or at a factory and/or when the application 224 is installed at the device 101; in such a provisioning process a size of a memory portion dedicated to the buffer 251 may be determined and stored in the parameters 250.

Figure 3:
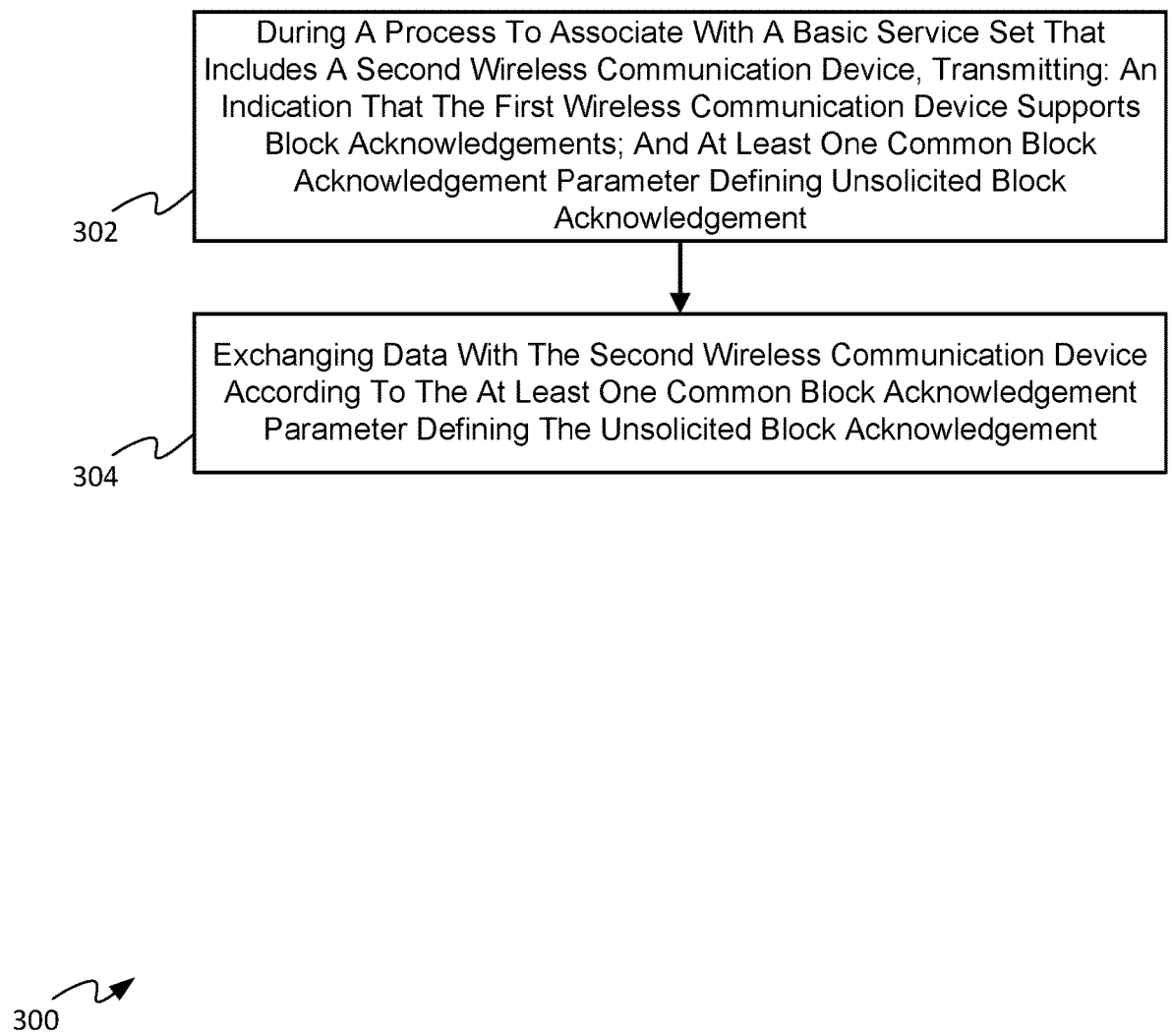
FIG. 3 depicts a flowchart of a method for unsolicited block acknowledgements in the system of FIG. 1, according to non-limiting implementations.

Attention is now directed to FIG. 3, which depicts a flowchart of a method 300 for implementing unsolicited block acknowledgement, according to non-limiting implementations. In order to assist in the explanation of method 300, it will be assumed that method 300 is performed using system 100, and specifically by controller 200 of device 101, for example when controller 200 implements the application 224. Indeed, method 300 is one way in which system 100 and/or the device 101 and/or the controller 200 can be configured. Furthermore, the following discussion of method 300 will lead to a further understanding of device 101, and system 100 and its various components. However, it is to be understood that system 100 and/or the device 101 and/or the controller 200 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise, various blocks may be performed in parallel rather than in sequence; hence the elements of method 300 are referred to herein as "blocks"

rather than "steps". It is also to be understood, however, that the method 300 can be implemented on variations of the system 100 as well. Furthermore, while the device 101 is described as implementing and/or performing each block of the method 300, it is appreciated that each block of the method 300 occurs using the controller 200 processing the application 224.

At a block 302, the controller 200, during a process to associate with a basic service set that includes the second wireless communication device 102, transmits, using a radio 220: an indication that the first wireless communication device 101 supports block acknowledgements; and at least one common block acknowledgement parameter defining unsolicited block acknowledgement.

Thereafter, at a block 304, the controller 200 exchanges data with the second wireless communication device 102 according to the at least one common block acknowledgement parameter defining the unsolicited block acknowledgement.

Method 300 will now be described with reference to FIG. 4 to FIG. 10II.

Figure 4:
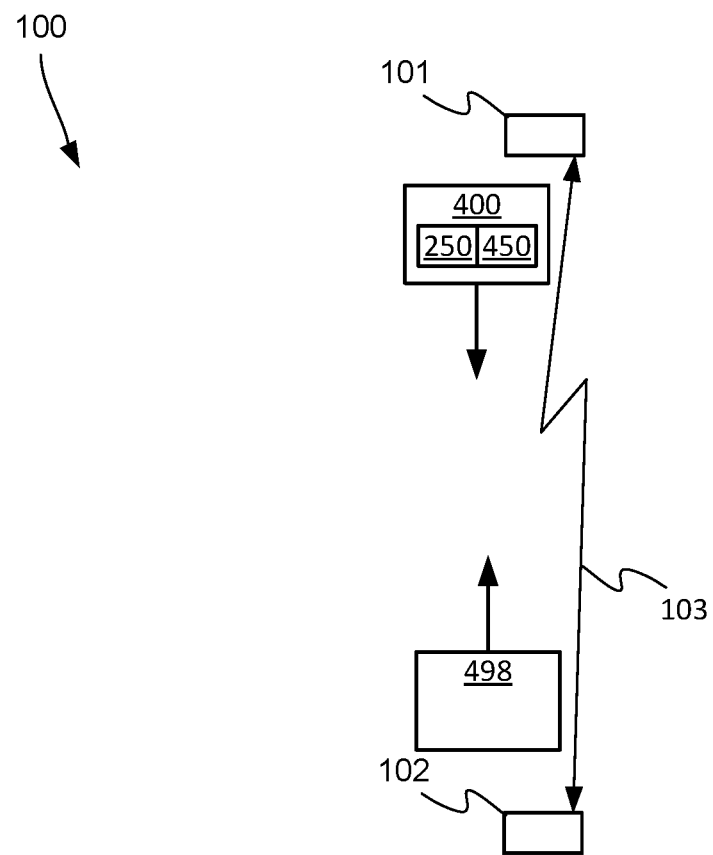
FIG. 4 depicts the devices of FIG. 1, negotiating an unsolicited block acknowledgement, according to non-limiting implementations.

Attention is next directed to FIG. 4, which depicts a non-limiting implementation of the block 302. FIG. 4 is substantially similar to FIG. 1, with like elements having like numbers. In FIG. 4, the device 101 is depicted transmitting a frame 400 to the device 102, the frame 400 includes an indication 450 that the first wireless communication device 101 supports block acknowledgements; and the at least one common block acknowledgement parameter 250 defining an unsolicited block acknowledgement. The frame 400 may also include one or more of a probe request and/or a probe request frame (for example that occurs during association in the 802.11 standard including, but not limited to, the 802.11ay standard), modified to include the indication 450 and the at least one common block acknowledgement parameter 250. Furthermore, the at least one common block acknowledgement parameter 250 may be a component of the indication 450. While not depicted, the frame 400 may also include an identifier of the device 101 (e.g. a MAC (media access control) identifier, and the like).

In particular, the frame 400 is transmitted without an ADDBA (Add Block Acknowledgement) request and an ADDBA response, which is eliminated from the process for association and the like. Rather, the device 102 receives the frame 400 and may immediately begin transmitting payload data frames to the device 101 in accordance with the common block acknowledgement parameter 250 and at least without an ADDBA request and/or an ADDBA response and/or a DELBA. Indeed, by virtue of transmitting and/or broadcasting the frame 400, the device 101 implicitly indicates that the device 101 is ready to receive payload data frames using block acknowledgments without further negotiation. Indeed, neither can the block acknowledgment functionality of the device 101 be deleted with a DELBA, and furthermore the use of block acknowledgements is established for the lifetime of an association between the devices 101, 102, again by virtue of the device 101 transmitting and/or broadcasting the frame 400 and the frame 400 being received by the device 101.

As also depicted in FIG. 4, in response to receiving the frame 400, the device 102 may transmit data 498 that may include a BAR (block acknowledgment request) to establish a start sequence number for payload data frames to be transmitted from the device 102 to the device 101 and/or the payload data frames. The data 498 can further include one or more of a probe response and/or a probe response frame, and the like, (e.g. a frame transmitted during an association process), and may include an identifier of the device 102 (e.g. a MAC identifier, and the like).

Attention is next directed to FIG. 5 which depicts non-limiting example implementations of the indication 450, and the at least one common block acknowledgement parameter 250, along with associated dedicated sizes (e.g. in octets or bits). The indication 450 may alternatively be referred to as an implicit block acknowledgement agreement and/or an unsolicited block acknowledgement element, and comprises an element ID (identifier) field, a length field, an element ID extension field (that can include further information related to the element ID field), and an implicit block acknowledgement agreement parameters field (which may be alternatively referred to as an unsolicited block acknowledgement field) which contains the parameters 250. As depicted, parameters 250 includes: a field 549 indicating a number of block acknowledgment agreements with which the device 101 has with other devices, a field 550 indicating whether A-MSDU (Aggregated Mac Service Data Unit) is supported, or not, when aggregating payload data frames (for example when receiving packets and/or payload data frames), a field 551 indicating whether a sustain state is supported or not (e.g. a value indicating whether the device 101 can sustain state dedicated to storing state information and/or plurality of payload data frames after loss of a transmission sequence (which may include one or more of a transmission opportunity (TXOP) and a service period (SP)), as described in more detail below), a field 552 indicating a size of the buffer 251 (e.g. a value indicative of a number of a plurality of payload data frames to be received from the second wireless communication device before transmitting a block acknowledgement frame, and/or a value indicative of number of buffers available to store a plurality of payload data frames to be received from the second wireless communication device 102 before transmitting a block acknowledgement frame, and/or a value indicative of a size of memory portion of the buffer 251 and the like). Further, as depicted, some portions of parameters 250 are reserved for later usage.

The format of the indication 450 depicted in FIG. 5 may be used when the frame 400 comprises a probe request frame. Alternatively, the format of the indication 450 depicted in FIG. 5 may be used when the frame 400 comprises a probe response frame, an association request frame, or an association response frames which may occur between an originator device (e.g. the device 101) and a recipient device (e.g. the device 102) when an association and/or a peer-to-peer connection is made between the devices. In other words, in some implementations, the device 101 may transmit the indication 450 in response to receiving a probe request frame and/or an association request frame from the device 102.

However, other formats of indications are within the scope of present implementations and will occur to persons of skill in the art. For example, in the DMG and/or EDMG specifications, there is a mechanism to solicit information about another "neighbour" device from a point coordinator device (e.g. a PCP/AP (point coordinator personal BSS (basic service set))/access point); such information includes indications of a device being capable of implicit and/or unsolicited block acknowledgments.

Furthermore, with reference to FIG. 2, the buffer 251 may now be dedicated to implementing unsolicited block acknowledgement with the device 102, at least while the devices 101, 102 are associated. When other unsolicited block acknowledgements are negotiated with other devices, other portions of the memory 204, and the like, may be dedicated and/or reserved for buffering with the other devices.

In some implementations, the device 102 may decline (e.g. via the data 498) the unsolicited block acknowledgement for example if the capabilities and/or processing resources and/or memory resources of the device 102 are not compatible with the parameters 250. When unsolicited block acknowledgements are rejected, block acknowledgements may still occur between the devices 101, 102, but an explicit block acknowledgement agreement is negotiated each time the devices 101, 102 associate.

In any event, while the devices 101, 102 are associates, transmission of data from the device 102 to the device 101 occurs via unsolicited block acknowledgements without negotiating a new block acknowledgement agreement, which may save time and processing resources during an association interval, and further eliminate an explicit block acknowledgment negotiation interval.

Operation the devices 101, 102 in accordance with unsolicited block acknowledgement is now described with respect to FIG. 6 to FIG. 10.

Figure 6:
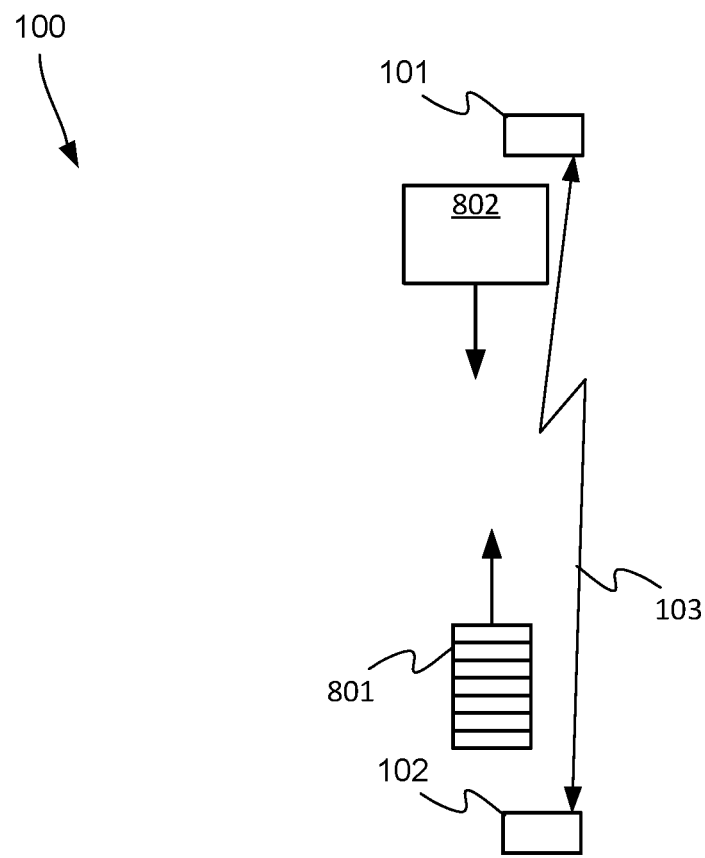
FIG. 6 depicts the devices of FIG. 1, exchanging data according to unsolicited block acknowledgement, according to non-limiting implementations.

FIG. 6 is substantially similar to FIG. 1, with like elements having like numbers. In FIG. 6, it is assumed that at least the block 302 of the method 300 has been implemented such that devices 101, 102 are operating according to the least one common block acknowledgement parameter 250 defining unsolicited block acknowledgement. In FIG. 6, the device 102 is transmitting a plurality of payload data frames 801 (e.g. AMPDU AGGREGATION in accordance with the at least one common block acknowledgement parameter 250) to the device 101, which responds by transmitting a block acknowledgement frame 802 in accordance with the at least one common block acknowledgement parameter 250, the block acknowledgement frame 802 acknowledging whether or not a portion of the plurality of payload data frames 801 was received or lost at the first wireless communication device 101, as described below. Payload data frames 801 as described herein may include packets and/or may alternatively be referred to as packets and/or may alternatively be referred to as frames. It is assumed that such payload data frames 801 include data that is to be received at the device 101, including, but not limited to, text data, browser data, audio data, image data, video data, and the like.

Indeed, once the devices 101, 102 are operating according to the least one common block acknowledgement parameter 250 defining unsolicited block acknowledgement, block acknowledgments occur by way of the device 102 transmitting, to the device 101, a number of payload data frames 801 that correspond to a number defined using unsolicited block acknowledgement, for example, a number of buffer fields in the buffer 251, before a block acknowledgement ("BA") is transmitted from the device 101 to the device 102. The behaviour in of the devices 101, 102 may depend on whether or not a sustain state was defined using unsolicited block acknowledgement.

Non-limiting examples of the block 304 are now described with reference to FIG. 7 to FIG. 10, each of which schematically depict devices 101, 102 and the buffer 251, which is alternatively referred to as a reorder buffer in each FIG. 7 to FIG. 10.

Furthermore, in each of FIG. 7 to FIG. 10, it is assumed that the device 101 is receiving data transmitted by the device 102, hence, the device 101 is labelled as a "Receiver" and the device 102 is labelled as a "Transmitter". It is further assumed that the devices 101, 102 are currently associated.

In each of FIG. 7 to FIG. 10, the device 101 is depicted as exchanging data with the second wireless communication device 102 according to the at least one common block acknowledgement parameter 250 defining the unsolicited block acknowledgement. Indeed, any lines pointing from the device 102 to the device 101 represent a transmission from the device 102 to the device 101, and any lines pointing from the device 101 to the device 102 represent a transmission from the device 101 to the device 102. Furthermore, in each of FIG. 7 to FIG. 10 it is assumed that the device 101 exchanges data with the second wireless communication device 102 according to the parameters 250 defining the unsolicited block acknowledgement during the lifetime of a given and/or current association between the devices 101, 102. In other words, in each FIG. 7 to FIG. 10, block acknowledgment agreements are not negotiated.

While only the buffer 251 is depicted at the device 101, it is assumed that the device 101 includes the components depicted in FIG. 2. It is further assumed that the buffer 251 includes sixteen buffer fields, and that the device 102 will hence transmit payload data frames in groups of sixteen; it is hence further assumed that the device 101 will transmit block acknowledgments of sixteen payload data frames. For example, each payload data frames can be numbered and the device 101 can further determine if one or more of a group of sixteen payload data frames have been lost based on the number of each payload data frame in a group being received.

Figure 7:
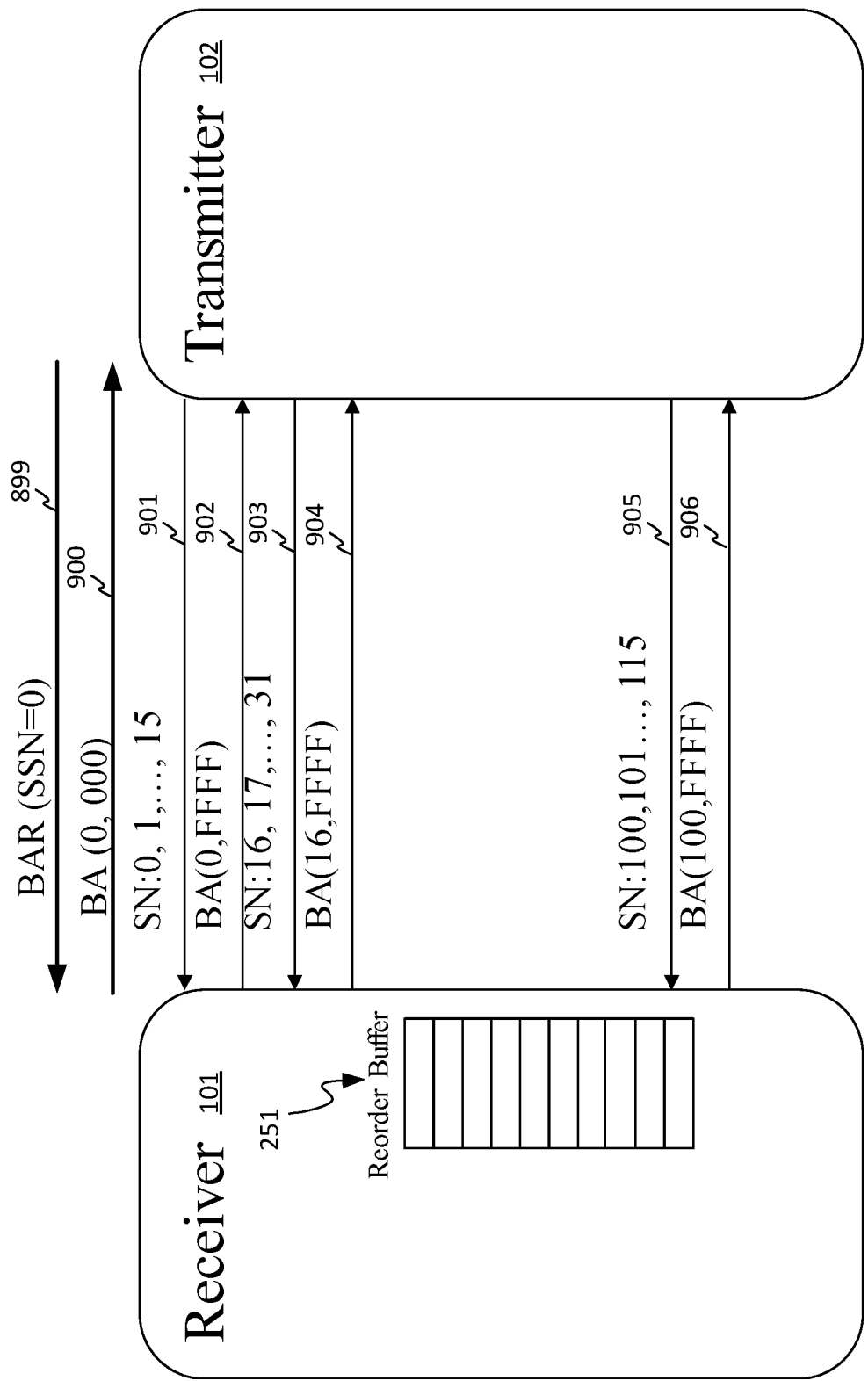
FIG. 7 depicts a signal diagram of the devices of FIG. 1, exchanging data according to unsolicited block acknowledgement, according to non-limiting implementations.

Attention is next directed to FIG. 7, in which the device 102 first transmits a block acknowledgment request ("BAR") 899 to the device 101 that includes a start sequence number indicating a first start sequence number to be used to transmit payload data frames, and the device 101, in response, transmits a block acknowledgment frame ("BA") 900 acknowledging the SSN in the BAR (e.g. the BA includes the number "0"). Thereafter, the device 102 transmits 901 sixteen payload data frames (e.g. "SN: 0, 1, ... , 15", where SN refers to a sequence number and/or packet number and/or a payload data frame number) to the device 101, which can store the payload data frames in the buffer 251 (not depicted) and/or can store an indication of whether or not each payload data frames was received or lost in each of the buffer fields. As depicted, all the payload data frames were received, hence the device 101 transmits a block acknowledgment 902 (e.g. a block acknowledgement ("BA") frame) to the device 102 which includes a number of the first payload data frame ("0") and a code ("FFFF") indicating all sixteen payload data frames were received.

The device 101 can then flush the buffer 251 in preparation for receipt of the next sixteen payload data frames. The device 102 then transmits 903 the next sixteen payload data frames, and the device 101 transmits a block acknowledgment 904 that all of the next sixteen payload data frames were received successfully. This process continues (e.g., represented by a transmission 905 of data and a block acknowledgment 906) while the devices 101, 102 are associated, with further data being transmitted. When the association between the devices 101, 102 ends, during a next association, the devices 101, 102 no longer implement the block 302, but rather rely on the unsolicited block acknowledgement therebetween represented by the parameters 250 being stored in association with the identifier 499, to again exchange and block acknowledge data.

Hence, in FIG. 7, the device 101 is depicted as receiving a plurality of payload data frames from the second wireless communication device 102; and, in response, transmitting a block acknowledgement frame in accordance with the at least one common block acknowledgement parameter 250, the block acknowledgement frame acknowledging whether or not a portion of the plurality of payload data frames was received or lost at the first wireless communication device 101. As depicted, all were received.

It is further assumed that all of the data exchange depicted in FIG. 7 occurs during a same transmission sequence (e.g. a transmission opportunity TXOP and/or a service period SP). However, when the devices 101, 102 exchange data during different transmission sequences, the unsolicited block acknowledgement is maintained.

Figure 8:
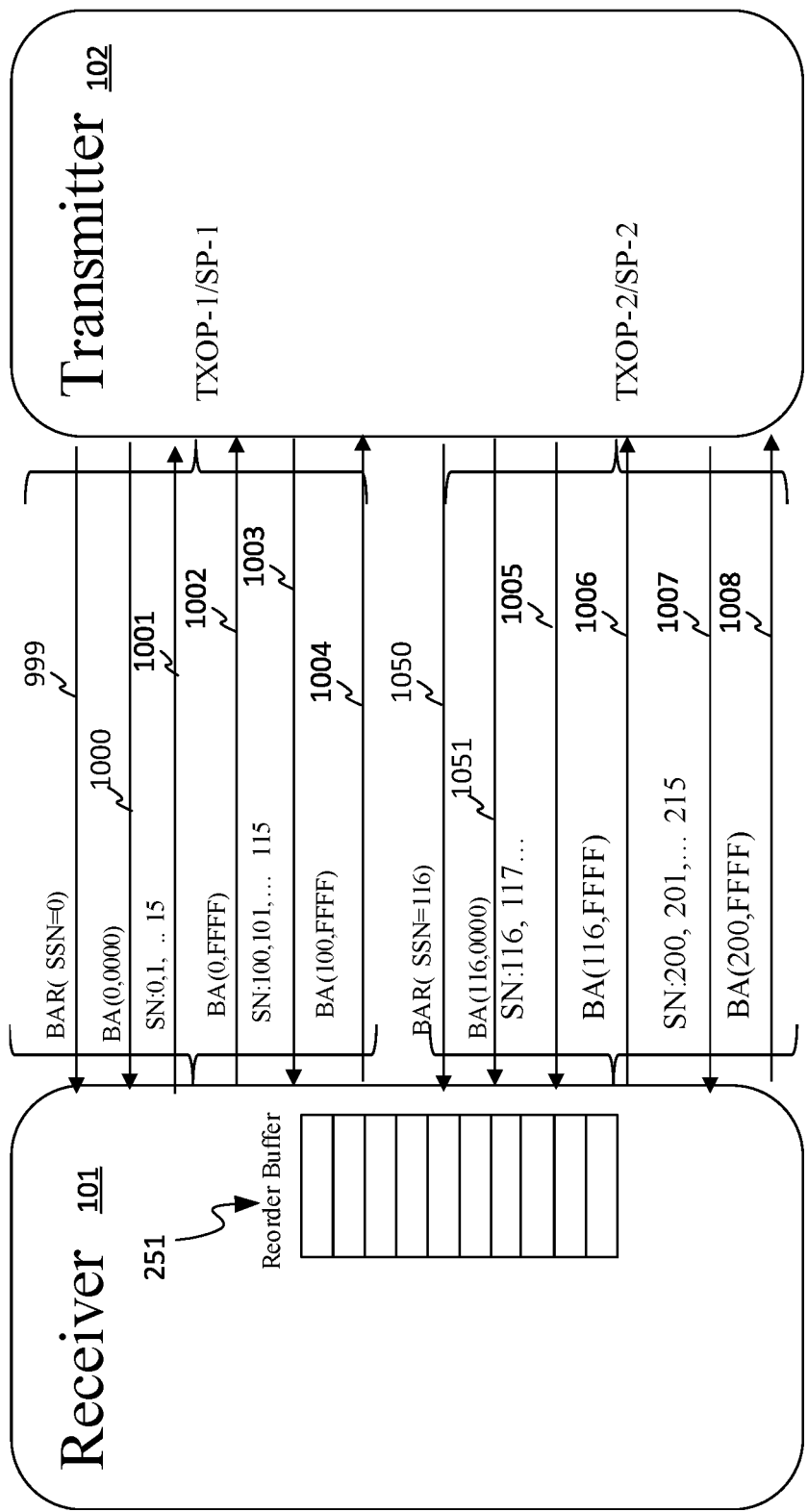
FIG. 8 depicts a signal diagram of the devices of FIG. 1, exchanging data according to unsolicited block acknowledgement, in two transmission sequences, according to non-limiting implementations.

For example, attention is next directed to FIG. 8, in which the devices 101, 102 exchange data during two transmission sequences (TXOP-1/SP-1, TXOP-2/SP-2). During the first transmission sequence TXOP-1, the devices 101, 102 again exchange a BAR 999 and BA 1000 respectively similar to the BAR 899 and BA 900, and then the device 102 transmits 1001, 1003 payload data frames in groups of sixteen to the device 101 (starting at the SN defined in the BAR 999), which respectively transmits block acknowledgements 1002, 1004 of the receipt of the payload data frames. As depicted, none of the payload data frames are lost. Once the first transmission sequence TXOP-1 ends, and a second transmission sequence TXOP-2 begins, the devices 102, 102 again exchange a BAR 1050 and BA to indicate an SSN of the second transmission sequence TXOP-2, and the device 102 continues to transmit 1005, 1007 the payload data frames in groups of sixteen to the device 101, which continues respectively transmits block acknowledgements 1006, 1008 of the receipt of the payload data frames. As depicted, none of the payload data frames are lost. This process continues while the devices 101, 102 are associated and during different transmission sequences. When the association between the devices 101, 102 ends, during a next association, the devices 101, 102 no longer implement the block 302, but rather rely on the unsolicited block acknowledgement therebetween represented by the parameters 250 being stored in association with the identifier 499, to again exchange and block acknowledge data.

However, the exchange of data between the devices 101, 102 during different transmission sequences, when a payload data frame is lost, may depend on whether or not the parameters 250 indicate that the device 101 sustains the buffer 251 between transmission sequences, or indicate that the device 101 does not sustain the buffer 251 between transmission sequences, for example as stored in the field 551.

Figure 9:
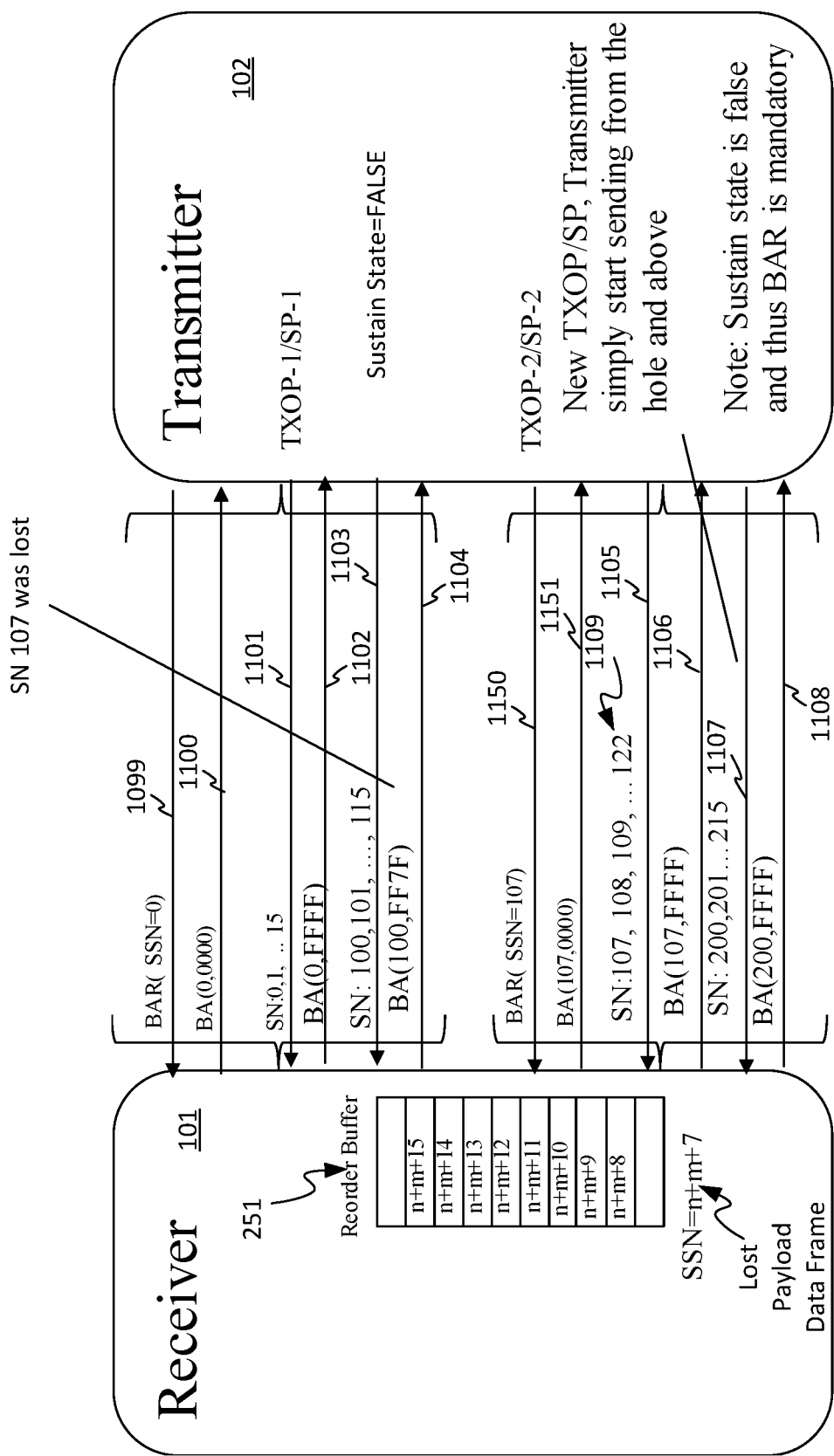
FIG. 9 depicts a signal diagram of the devices of FIG. 1, exchanging data according to unsolicited block acknowledgement, in two transmission sequences, when a sustain state is false, and a payload data frame is lost, according to non-limiting implementations.

For example, attention is next directed to FIG. 9, in which the devices 101, 102 exchange data during two transmission sequences (TXOP-1, TXOP-2). It is further assumed in FIG. 9 that the sustain state field 551 is "FALSE", and the like and hence the device 101 cannot sustain the buffer 251 between transmission sequences. During the first transmission sequence TXOP-1, the devices 101, 102 again exchange a BAR 1099 and BA 1100 respectively similar to the BAR 899 and BA 900, and then the device 102 transmits 1101, 1103 payload data frames in groups of sixteen to the device 101, which respectively transmits block acknowledgements 1102, 1104 of the receipt of the payload data frames. Once the first transmission sequence TXOP-1 ends, and a second transmission sequence TXOP-2 begins, the device 102 continues to transmit 1105, 1107 the payload data frames in groups of sixteen to the device 101, which continues respectively transmits block acknowledgements 1106, 1108 of the receipt of the payload data frames.

However, in contrast to FIG. 8, in FIG. 9, a payload data frame from the transmission 1103 is lost at the end of the first transmission sequence, for example, payload data frame "107". Hence, the block acknowledgement 1104 indicates that the payload data frame "107" was lost, while the remainder were received, using a code "FF7F". The position of the lost payload data frame may colloquially be referred to as a hole.

Furthermore, in FIG. 9 the buffer 251 is depicted as populated with data indicating which payload data frames were received or lost (e.g. where n and m are counters, n being a counter of groups of payload data frames (e.g. n=1 for the sixteen payload data frames transmitted in transmission 1101 and incremented for each successive transmission of sixteen payload data frames) and m being a counter of payload data frames within each transmission of sixteen payload data frames). Hence, as depicted, the fields of the buffer 251 are populated to indicate that while payload data frame "107" was lost (e.g. n+m+7), the remaining data frames (n+m+8, n+m+9, etc.) were received. While not depicted, it is further assumed the buffer 251 stores indicating that the payload data frames corresponding to n+m+0, n+m+1 . . . n+m+6, were also received.

In any event, when the block acknowledgement 1104 indicates that the payload data frame "107" was lost and the first transmission sequence has not ended, the device 102 may re-transmit the payload data frame "107".

However, when the block acknowledgement 1104 indicates that the payload data frame "107" was lost, the first transmission sequence has ended, and the sustain state in the unsolicited block acknowledgement is "FALSE" and the like, at the end of the first transmission sequence, the buffer 251 is flushed, the fields depicted in FIG. 9 are emptied, and the device 101 no longer has a record of which payload data frames were received or lost. Hence, the device 102 begins to transmit 1105 payload data frames in the second transmission sequence beginning with the lost payload data frame "107" as indicated in the packet numbers 1109, and includes payload data frames already received.

Furthermore, as depicted, in some implementations, when the second transmission sequence begins, the device 102 may transmit a block acknowledgment request 1150 specifically requesting a status of the lost payload data frame (e.g. the BAR 1150 includes the SSN=107), and the device 101 may respond with a block acknowledgment 1151 with a code "107" indicating the lost payload data frame 107 and/or whether or not the payload data frames having SN greater than 107 has been stored (e.g. sustained). As the sustain state is false. The BA 1151 includes a code "0" indicating that the device 101 no longer has record of whether or not the lost payload data frame indicated in the block acknowledgment request was lost or not. The device 101 then continues with the transmission 1105.

Put another way, when one or more of a plurality of payload data frames was lost in a first transmission sequence, the device 101 may begin a second transmission sequence, in which further payload data frames are received from the second wireless communication device 102 starting with a lost payload data frame from the first transmission sequence and includes already received payload data frames following the lost payload data frame. While FIG. 9 depicts lost data frame occurring at the end of TXOP-1, data frames may be lost during a transmission sequence, and retransmitted in the same transmission sequence.

This process continues over the lifetime of the association between devices 101, 102 without negotiating a block acknowledgement agreement.

However, the behaviour of the devices 101, 102 can change when the sustain state field 551 is "TRUE, and the device 101 can sustain the buffer 251 between transmission sequences. For example, attention is next directed to FIG. 10, in which the devices 101, 102 exchange data during two transmission sequences (TXOP-1/SP-1, TXOP-2/SP-2). It is further assumed in FIG. 10 that the sustain state field 551 is "TRUE", and the like and hence the device 101 can sustain the state and/or buffers 251 between transmission sequence.

During the first transmission sequence (TXOP-1/SP-1), the devices 101, 102 again exchange a BAR 11199 and BA 1200 similar to the BAR 899 and BA 900, and then the device 102 transmits 1201, 1203 payload data frames in groups of sixteen to the device 101, which respectively transmits block acknowledgements 1202, 1204 of the receipt of the payload data frames. As in FIG. 9, payload data frame "107" is lost at the end of the first transmission sequence, as indicated in the buffer 251. Hence, the block acknowledgement 1204 indicates that the payload data frame "107" was lost, while the remainder were received, using a code "FF7F".

However, in contrast to FIG. 9, the sustain state is "TRUE". Hence, as depicted, in some implementations, at the beginning of the second transmission sequence, the device 102 transmits 1205 a block acknowledgment request 1299 based on the last block acknowledgment 1204 of the first transmission sequence to confirm that the payload data frame "107" was lost. As the device 101 has maintained the buffer 251 between transmission sequences, the device 101 transmits a block acknowledgement 1206 that includes a confirmation that the payload data frame "107" was lost (e.g. using code "1FE").

The device 102 then continues to transmit 1207 the payload data frames in groups of sixteen to the device 101, including the lost payload data frame "107" but excluding received payload data frames not lost in the first transmission sequence. Hence, for example, in the transmission 1207, the device 102 transmits payload data frames "107, 116, 117 . . . " etc.), as the payload data frames between "107" and "116" were already received at the device 101.

In some implementations, however, the block acknowledgment request 1299 and the block acknowledgment of the transmission 1206 may be omitted, (as well as BAR 899, and BA 900, and the like), and the device 102 may begin the second transmission sequence with the transmission 1207, based on the last block acknowledgment transmitted 1205 by the device 101, the transmission 1207 acknowledged via the block acknowledgement 1208. The process then continues as represented by the transmission 1209 and the block acknowledgment 1210.

Figure 10:
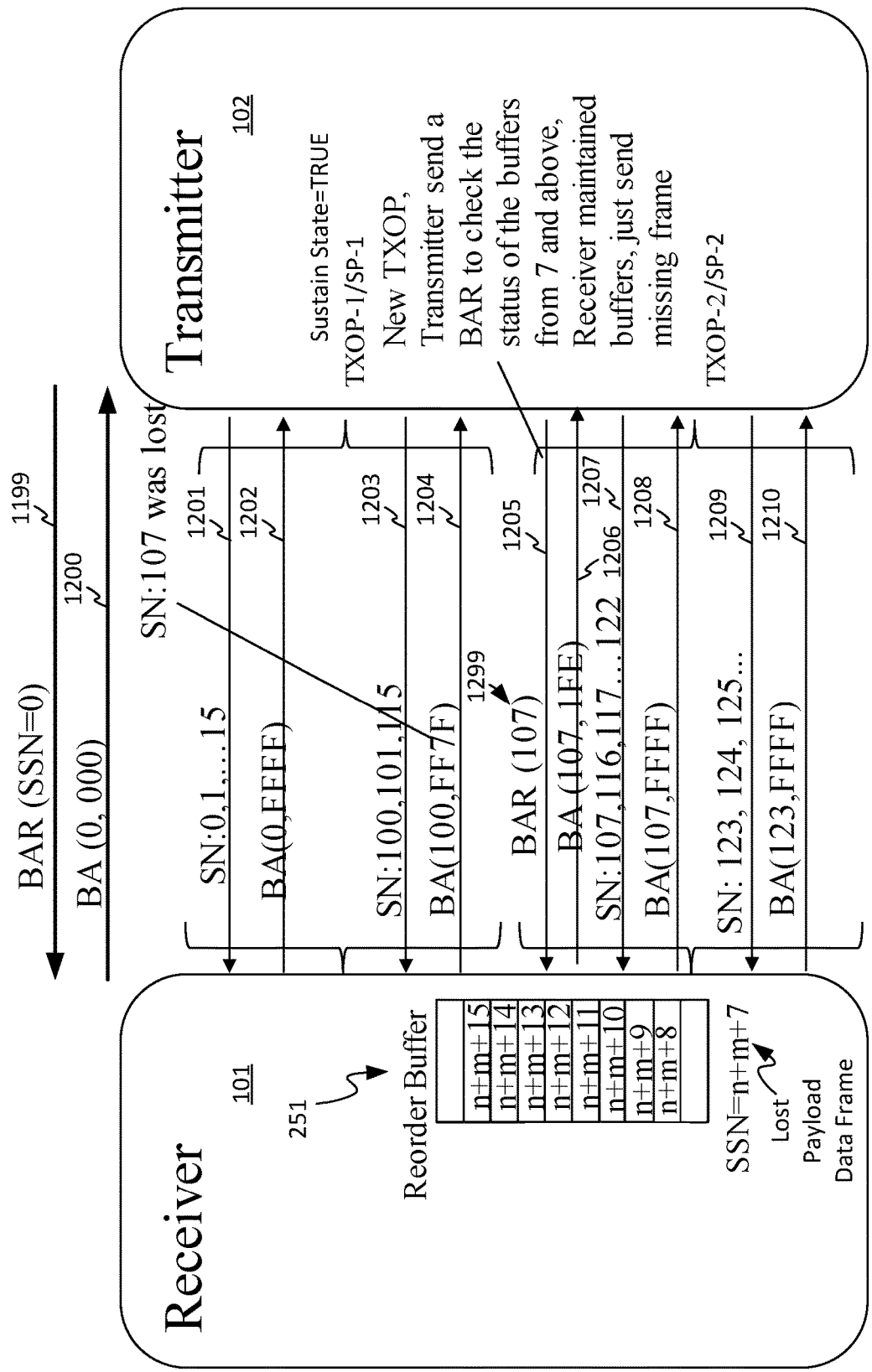
FIG. 10 depicts a signal diagram of the devices of FIG. 1, exchanging data according to unsolicited block acknowledgement, in two transmission sequences, when a sustain state is true, and a payload data frame is lost, according to non-limiting implementations.

In any event, FIG. 10 depicts that, in some implementations, when one or more of a plurality of payload data frames was lost in a first transmission sequence, the device 101 may begin a second transmission sequences in which receipt of further payload data frames from the second wireless communication device 102 includes a lost payload data frame from the first transmission sequence and excludes received payload data frames not lost in the first transmission sequence.

As described above this process continues while the devices 101, 102 are associated without needing to negotiate block acknowledgment agreements.

In any event, the device 101 may operate according to unsolicited block acknowledgements with a plurality of devices using, for example indication 450 (e.g. an unsolicited block acknowledgement element). The device 101 may further advertise the number of unsolicited block acknowledgements it supports (e.g. a number of devices with which the device 101 may operate with unsolicited block acknowledgements). Such operating using unsolicited block acknowledgements is further indicative of shared resources (e.g. respective buffers 251) across all devices engaged in the unsolicited block acknowledgements. The more unsolicited block acknowledgements that are supported by the device 101 (which may depend on an amount of memory dedicated to the respective buffers for each agreement), the more efficient an unsolicited block acknowledgement protocol becomes, since there will be fewer times that agreements need to be negotiated. Furthermore, the more often the sustain state field is "TRUE", the fewer times buffers flushed and the less overhead is needed to get a BAR/BA across which may reduce a number of correctly received frames being re-transmitted.

Furthermore, in some implementations, when a recipient device (e.g. the device 101) that supports at least one unsolicited block acknowledgement receives an A-MPDU (Aggregated Mac Protocol Data Unit), or other payload data frames, not associated with an explicit block ack agreement (e.g. negotiated using ADDBA Req/Resp), such other payload data frames may use the resources associated with an unsolicited block acknowledgement, for example the buffer 251. Indeed, the resources of unsolicited block acknowledgements may continue to be used while the device 101 is receiving payload frames from the same device. However, once the device 101 receives a payload data frame from another device, it can either use resources (e.g. another buffer) not used for another device operating according to unsolicited block acknowledgements, or flush the buffer 251 to be used with the other device or traffic stream (TID). However, when payload data frames are received from the device 102, to which the buffer 251 is dedicated, the buffer 251 is flushed and the buffer 251 is used with the payload data frames from the device 102.

When the device 102, that is to transmit payload data frames, and is further enabled for unsolicited block acknowledgements, the device 102 shall implement an unsolicited block acknowledgement for such transmissions only when a recipient device, such as the device 101, supports unsolicited block acknowledgements.

Furthermore, once the device 102 uses the capability of unsolicited block acknowledgement and transmits payload data frames according to the unsolicited block acknowledgement, the device 102 maintains the transmitted payload data frames that have been transmitted for re-transmission, if needed, for example as an aggregated frame, or unaggregated frames. The device 102 continues to implement the parameters of any explicit block acknowledgment agreements, including buffer size and A-MSDU supported fields (e.g. either in the data transmission phase when operating according to unsolicited block acknowledgement, or for other existing explicit block acknowledgment agreements).

When the device 102 transmits payload data frames under unsolicited block acknowledgement, the device 102 further stores the frames from a first un-acknowledged frame until the end of a current window for re-transmission in the event the devices 101 flushes the buffer 251.

When the device 102 acquires and/or enters a new transmission sequence, for example with the device 101, the device 102 is configured to assume that the device 101 is maintaining the buffer 251 until the end of the sequence. When a new sequence begins for the device 102, and the device 102 wishes to re-use the unsolicited block acknowledgement, the device 102 may transmit an aggregated frame or unaggregated frames without any negotiation of block acknowledgements. When the device 102 has stored unacknowledged frames from the previous sequence, the device 102 may determine if the recipient device 101 has sustained the buffer 251. As described above, when the buffer 251 is sustained, the device 102 can one or: retransmit all the payload data frames, including previously acknowledged frames; or the device 102 may transmit a block acknowledgement request frame in order to retrieve the state of the buffer 251, and only re-transmit those payload data frames that have not been received at the device 101.

Those skilled in the art will appreciate that in some implementations, the functionality of devices 101, 102 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 102 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A method of a first wireless communication device for utilizing unsolicited block acknowledgements with a second wireless communication device, the method comprising:
    during a process to associate with a basic service set that includes the second wireless communication device, transmitting, via a controller and using a radio: a frame for associating the first wireless communication device and the second wireless communication device,
        the frame including: an indication that the first wireless communication device supports block acknowledgements; at least one common block acknowledgement parameter defining the block acknowledgements; and one or more of: a probe request frame a probe response frame, an association request frame, and an association response frame;
        the frame transmitted without an Add Block Acknowledgement (ADDBA) request, and without an ADDBA response;
        the frame indicating that the first wireless communication device is ready to respond to payload data frames using the block acknowledgements without further negotiation and without negotiating block acknowledgment agreements during association with the basic service set; and
        the frame further indicating: that use of the block acknowledgements cannot be deleted with delete block acknowledgments (DELBAs); and the use of the block acknowledgements is established for a lifetime of an association between the first wireless communication device and the second wireless communication device; and thereafter,
    exchanging data with the second wireless communication device according to the at least one common block acknowledgement parameter defining the block acknowledgements.

2. The method of claim 1, wherein the at least one common block acknowledgement parameter comprises a value indicative of a number of a plurality of payload data frames to be received from the second wireless communication device before transmitting a block acknowledgement frame.

3. The method of claim 1, wherein the at least one common block acknowledgement parameter comprises a value indicative of number of buffers available to store a plurality of payload data frames to be received from the second wireless communication device before transmitting a block acknowledgement frame.

4. The method of claim 1, further comprising: receiving a plurality of payload data frames from the second wireless communication device; and, in response, transmitting a block acknowledgement frame in accordance with the at least one common block acknowledgement parameter, the block acknowledgement frame acknowledging whether or not a portion of the plurality of payload data frames was received or lost at the first wireless communication device.

5. The method of claim 1, further comprising, when first associating with the second wireless communication device, transmitting, via the controller and using the radio, a value indicative of whether the first wireless communication device can sustain state and/or buffers dedicated to storing a plurality of payload data frames after loss of a transmission sequence.

6. The method of claim 1, further comprising receiving, from the second wireless communication device, a block acknowledgment request that includes an indication of a start sequence number of the plurality of payload data frames.

7. The method of claim 1, further comprising, when one or more of a plurality of payload data frames was lost in a first transmission sequence, beginning a second transmission sequence, in which further payload data frames are received from the second wireless communication device starting with a lost payload data frame from the first transmission sequence and includes already received payload data frames following the lost payload data frame.

8. The method of claim 1, further comprising, when one or more of a plurality of payload data frames was lost in a first transmission sequence, beginning a second transmission sequence in which receipt of further payload data frames from the second wireless communication device includes a lost payload data frame from the first transmission sequence and excludes received payload data frames not lost in the first transmission sequence.

9. A wireless communication device for utilizing block acknowledgements with a second wireless communication device, the wireless communication device comprising:
    a controller interconnected with a memory and a radio, the controller configured to:

during a process to associate with a basic service set that includes the second wireless communication device, transmit, using the radio: a frame for associating the wireless communication device and the second wireless communication device, the frame including: an indication that the wireless communication device supports block acknowledgements; at least one common block acknowledgement parameter defining the block acknowledgements; and one or more of: a probe request frame a probe response frame, an association request frame, and an association response frame;

the frame transmitted without an Add Block Acknowledgement (ADDBA) request, and without an ADDBA response;

the frame indicating that the first wireless communication device is ready to respond to payload data frames using the block acknowledgements without further negotiation and without negotiating block acknowledgment agreements during association with the basic service set; and the frame further indicating: that use of the block acknowledgements cannot be deleted with delete block acknowledgments (DELBAs); and the use of the block acknowledgements is established for a lifetime of an association between the first wireless communication device and the second wireless communication device; and thereafter, exchange data with the second wireless communication device according to the at least one common block acknowledgement parameter defining the block acknowledgements.

10. The wireless communication device of claim 9, wherein the at least one common block acknowledgement parameter comprises a value indicative of a number of a plurality of payload data frames to be received from the second wireless communication device before transmitting a block acknowledgement frame.

11. The wireless communication device of claim 9, wherein the at least one common block acknowledgement parameter comprises a value indicative of number of buffers available to store a plurality of payload data frames to be received from the second wireless communication device before transmitting a block acknowledgement frame.

12. The wireless communication device of claim 9, wherein the controller is further configured to: receive a plurality of payload data frames from the second wireless communication device; and, in response, transmit a block acknowledgement frame in accordance with the at least one common block acknowledgement parameter, the block acknowledgement frame acknowledging whether or not a portion of the plurality of payload data frames was received or lost at the wireless communication device.

13. The wireless communication device of claim 9, wherein the controller is further configured to: when first associating with the second wireless communication device, transmit a value indicative of whether the wireless communication device can sustain state and/or buffers dedicated to storing a plurality of payload data frames after loss of a transmission sequence.

14. The wireless communication device of claim 9, wherein the controller is further configured to: receive, from the second wireless communication device, a block acknowledgment request that includes an indication of a start sequence number of the plurality of payload data frames.

15. The wireless communication device of claim 9, wherein the controller is further configured to: when one or more of a plurality of payload data frames was lost in a first transmission sequence, begin a second transmission sequence, in which further payload data frames are received from the second wireless communication device starting with a lost payload data frame from the first transmission sequence and includes already received payload data frames following the lost payload data frame.

16. The wireless communication device of claim 9, wherein the controller is further configured to: when one or more of a plurality of payload data frames was lost in a first transmission sequence, begin a second transmission sequence in which receipt of further payload data frames from the second wireless communication device includes a lost payload data frame from the first transmission sequence and excludes received payload data frames not lost in the first transmission sequence.

* * * * *